Figure 1:
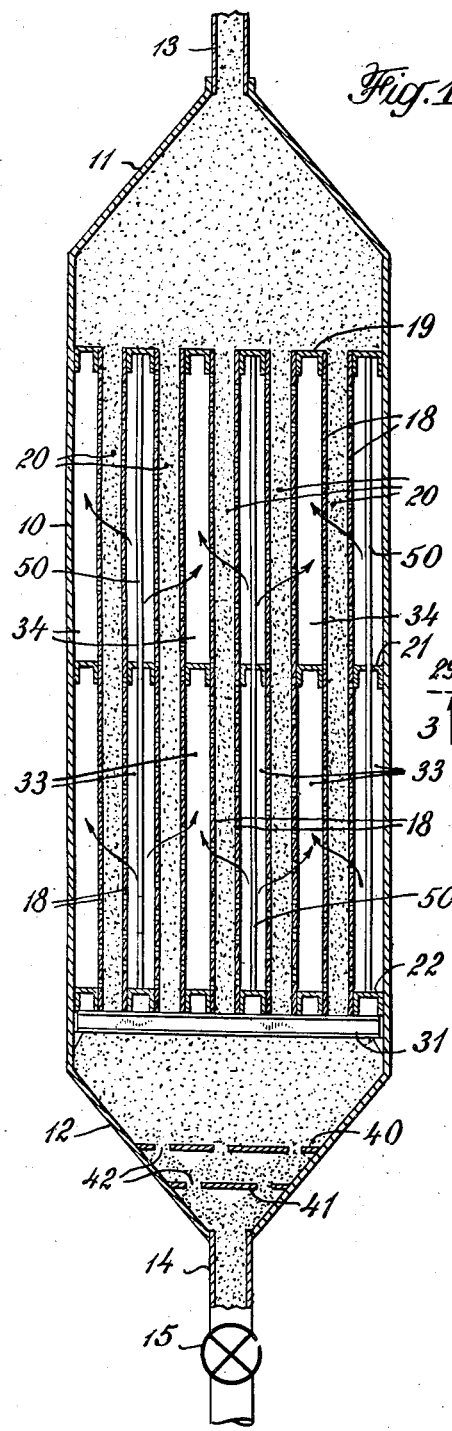

June 21, 1949.   C. H. LECHTHALER ET AL   2,474,199
METHOD FOR CONTACTING GASES AND
MOVING PARTICLE FORM SOLIDS Filed Nov. 9, 1944   2 Sheets-Sheet 1

CHARLES H. LECHTHALER
JOHN W. PAYNE
PETER D. VALAS
INVENTORS

BY
ATTORNEY

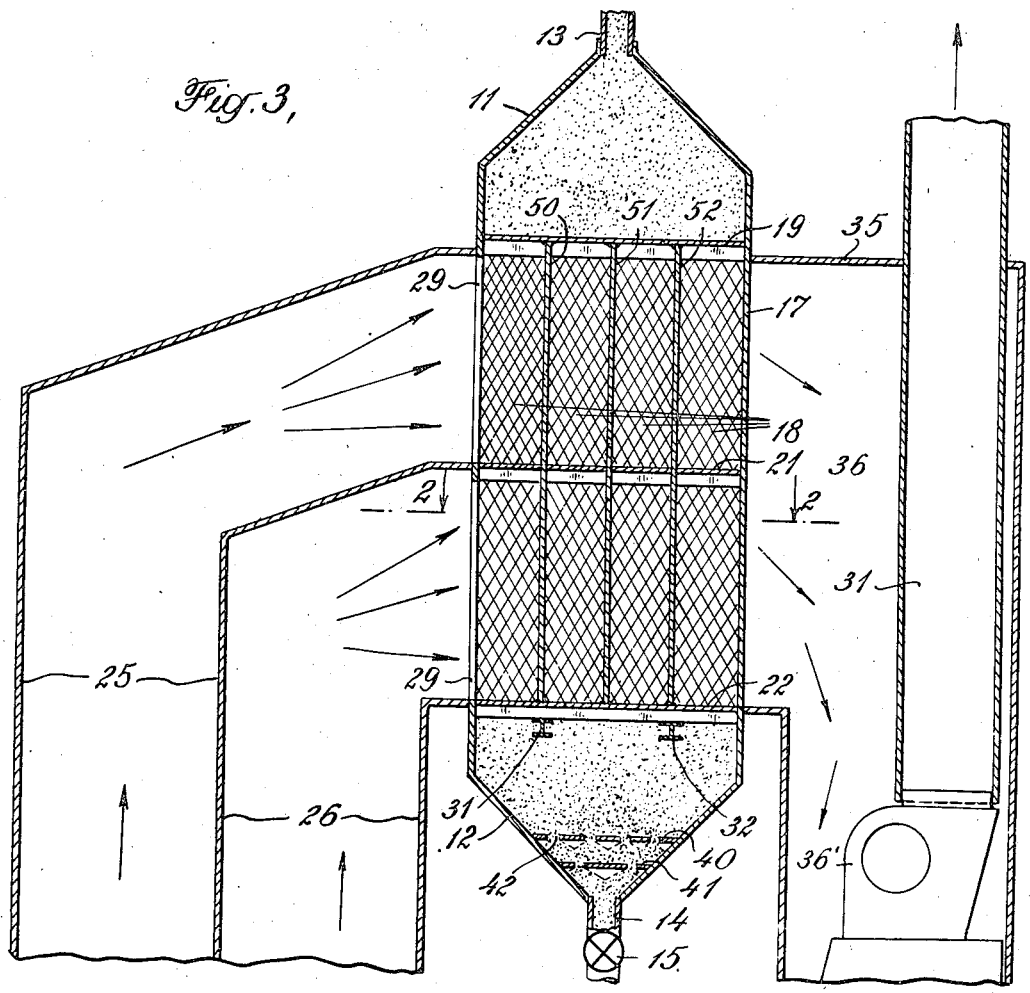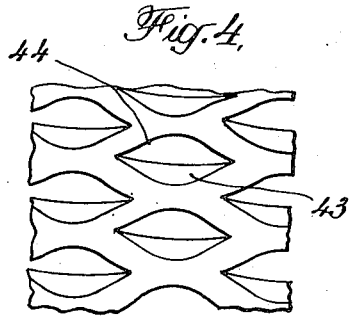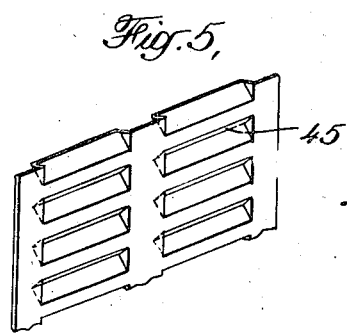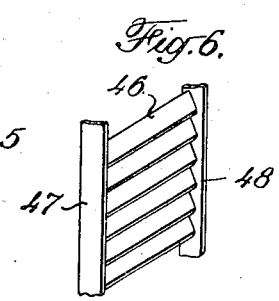

Patented June 21, 1949

2,474,199

UNITED STATES PATENT OFFICE 2,474,199

METHOD FOR CONTACTING GASES AND MOVING PARTICLE FORM SOLIDS

Charles H. Lechthaler, John W. Payne, and Peter D. Valas, Woodbury, N. J., assignors to Socony-Vacuum Oil Company, Incorporated, a corporation of New York Application November 9, 1944, Serial No. 562,724

9 Claims. (Cl. 34—31)

This invention has to do with a method for conducting operations wherein particle form solid materials are contacted with gases for any of a number of purposes such as gas or solid treatment, heat exchange, gaseous conversions or solid drying.

This invention is specifically directed to a method for drying particle form solid materials by contact with suitably controlled drying gases. The invention may be utilized in drying many types of solid material particles but is particularly well adapted to processes for drying particle form solid adsorbent materials such as are now used in catalytic conversion processes. Some of these conversion processes, for example, the catalytic conversion of hydrocarbon gases may entail the continuous cyclic flow of a particle form solid adsorbent material through conversion and catalyst regeneration zones. It is of great importance in such processes that the solid material particles so circulated be hard and rugged in structural strength and free from internal stresses so as to prevent undue breakdown in the size thereof.

Typical of such solid adsorbent materials are certain pelleted clay-type catalysts which are formed by high pressure extrusion of a wet powdered clay followed by the drying thereof. In order to prevent substantial cracking and breakdown of the pelleted particles during the drying or to prevent the pelleted particles from drying with serious internal structural strains resulting in a structurally weak dried product, it is highly important that the drying operation be carefully controlled in rate and temperature during its progress. The drying of such adsorbent materials not only requires the use of a drier of enormous capacity, but also one permitting close control of the rate of drying during the various stages thereof. Due to the rapid increase in the number and types of catalytic conversion and other processes involving contact of gases with particle form solid adsorbent materials the tonnage requirements for such solid materials has increased to enormous proportions. As a consequence, the highly complicated batch type driers used heretofore which were not only highly complicated and expensive in construction and operation but also relatively low in capacity are no longer suitable for manufacture of such solid materials at costs commensurate with the high tonnage requirements.

A major object of this invention is the provision of a relatively economical and simple method for contacting moving particle form solid materials with gases, which method permits a high rate of gas throughput and uniform and controlled contacting of all the solid material.

Another object of the invention is the provision of a method for the drying of particle form solid adsorbent materials, which method permits careful control of the drying rate and temperature during its progress.

Another object of this invention is the provision of a continuous multistage method of drying for particle form solid materials wherein the solid material is subjected to at least two substantially different sets of drying conditions during its passage as a substantially continuous column through a single drying vessel.

A specific object of this invention is the provision of a method for drying particle form solid adsorbent materials which involves the transverse passage of a drying gas through a column or columns of the solid material particles while maintaining a substantially uniform rate of drying across the entire cross-section of said column or columns.

These and other objects of this invention will become apparent from the following discussion thereof.

Before proceeding further, however, a term which will be used hereinafter both in describing and claiming this invention should be defined. This term is "moisture" as used in "moisture containing solid material" and is intended as covering not only water but any other liquid which is to be removed from the solid material.

This invention involves the passage of the moisture containing particle form solid material through a drying zone as a substantially compact column or plurality of such columns of moving particle form solid material and the passage of a controlled drying gas through said column or in parallel through said columns in a direction transverse to that of the solid material flow through the drying zone. Such operation provides a large column cross-section for gas flow thereby permitting unusually high total gas throughput rates and low pressure drops with resultant high drying rates and very low operation costs. It has been found that uniform drying rates across the entire solid material column and proper control of drying conditions may not generally be obtained in such an operation without close control of the relationship between the rate of gas flow at the chosen drying conditions, the increase in percentage humidity and the width of the column of solid material in the direction of gas flow. An important part of this invention involves a method utilizing the proper relationship.

Moreover, it has also been found that in such an operation involving relatively low pressure drops due to gas throughput, uniform gas flow across the entire column cross-section will not be obtained without careful distribution of the inlet gas to the operation. This invention provides a simple baffle means in the gas inlet passages coupled with proper gas inlet and outlet duct design which insures uniform flow of gas across the entire column cross-section.

Figure 2:
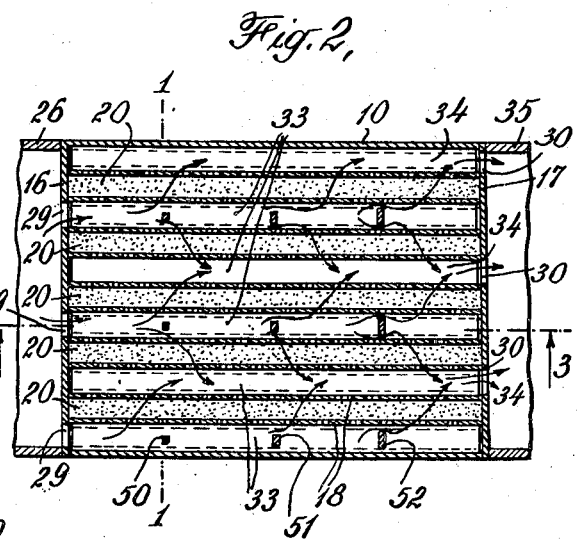

These and other features of this invention may be more readily understood by reference to the attached drawings of which Figure 1 is an elevational view, partially in section, of a drier constructed according to this invention. Figure 2 is a sectional plan view of the drier shown in Figure 1. Figure 3 is a sectional elevation view taken along the line 3—3 in Figure 2. Figures 4, 5, and 6 are views of modified forms of partitioning which may be used in the apparatus shown in Figures 1 through 3, inclusive. All of these drawings are highly diagrammatic in form.

Turning now to Figures 1 through 3, inclusive, which may best be discussed together, we find 10 is the shell of a substantially vertical drier closed on its upper and lower ends by converging sections 11 and 12, respectively. An inlet conduit 13 for solid material inlet is provided at the upper end and an outlet conduit 14 having flow throttle valve 15 thereon is provided at the lower end. The shell shown is rectangular in cross-section but may be of other shapes with proper modifications in the internal partition arrangement. Also for some operations, the upper end of the drier may be left open rather than closed, as shown. A plurality of substantially vertical, parallel foraminate partitions 18 are supported across the shell between the opposite walls 16 and 17 in such a way as to provide a plurality of vertical passages extending through the vessel between said walls. Support members 31 and 32 are provided below the partitions to aid in their support within the vessel. Covering partitions 19 are provided near the upper ends of alternate members of these passages so as to provide gas handling passages from which the entering solid material is excluded, while providing between such gas handling passages, vertically extending passages 20 for solid material flow through the vessel. Similar partitions 21 and 22 extend across said gas handling passages at an intermediate level and near the lower end thereof respectively, thereby dividing each of said passages into two superimposed sections.

Openings 29 are provided in the wall 16 along the length of alternate gas handling passages 33 so as to place said passages in free gaseous communication with the gas inlet ducts 25 and 26. Gas is supplied to the upper half of the gas spaces 33 between the levels of partitions 19 and 21 through duct 25, and to the lower half of the gas spaces between partitions 21 and 22 through duct 26. Similarly, openings 30 are provided in the partition 17 along the length of the opposite ends of the remaining alternate gas passages 34 so as to provide gaseous communication between said passages and the gas outlet duct 35. The duct 35 defines a large closed chamber in the lower end of which is located a blower 36. The cross-section of the chamber should preferably be sufficient to provide a free cross-section for gas flow as great as the sum of the cross-sections of the gas passages 34. The blower 36 is provided with an outlet stack 37 for the effluent gas. In some installations the blower may be eliminated and a high stack with dampers therein provided for draft control. It will be understood that the details of internal construction for the provision of alternate solid material and gas passages with means for admitting and withdrawing gas to and from the proper gas passages my be varied somewhat from the particular construction shown herein. Such modifications will be readily apparent to those skilled in the art and are to be included within the scope of this invention.

Supported vertically within the gas inlet passages 33 at spaced horizontal intervals are the baffles 50, 51 and 52 which serve to restrict the cross-section for gas flow in the passages 33 at the positions of said baffles. It will be seen that the baffle members have progressively greater projected cross-sectional areas the greater the distance thereof from the gas inlet ends of the passages 33. Within the converging section 12 at the lower end of the shell, two partitions 40 and 41 are positioned horizontally thereacross. Properly spaced orifices 42 are provided through these partitions so as to cause the solid material flow to be divided into a plurality of streams uniformly distributed with respect to the vessel cross-section which streams are gradually recombined in the proper proportion to the single outlet stream passing through outlet conduit 14. This partition and orifice arrangement thus provides uniform flow of solid material from all of the solid material flow passages 20. It should be understood that any other arrangement which will also provide uniform withdrawal of solid material from all the passages 20 may be substituted for the partition and orifice arrangement shown.

As has been hereinbefore stated the passage forming partitions 18 are foraminate, the openings therein being uniformly distributed over the partition area and such as to permit free gas flow between the gas handling passages and the solid material flow passages while substantially preventing the gravity flow of solid material into the gas handling passages. The partitioning may consist of wire screening or it may consist of an expanded metal type of screening such as is shown in Figure 4. The openings 43 in such screening may be larger in size than the diameter of the solid material particles being dried, provided the sheeting is so expanded that the metal lip 44 shields the opening from the gravity flow of solid material thereinto.

In Figure 5, a different type of partitioning is shown, which comprises a sheet of material having louvers 45 therein.

In Figure 6, still another form of partitioning is shown which comprises a vertical row of horizontally extending, parallel, spaced, sloping slats 46 supported between suitable end members 47 and 48.

Turning again to Figures 1 through 3 for a study of the operation of the drier, moisture containing particle form solid material is admitted thereto through the conduit 13 at the upper end and passes downwardly through the shell in the plurality of vertically extending passages 20. Dried solid material particles pass uniformly from the lower ends of the several passages, through the orifices in the partitions 40 and 41 and through the outlet conduit 14. The rate of solid material flow is throttled by means of valve 15 in the outlet conduit 14 so as to insure its complete drying during its passage through the drier and so as to cause it to flow through the passages 20 as substantially compact columns.

A drying gas heated to a suitable temperature in a furnace (not shown) is pulled into the duct 25 and distributes itself therefrom into the upper sections of the gas inlet passages 33. It then passes from the gas inlet passages 33 through the foraminate partitions 18 and transversely across the upper sections of the columns of solid material in the passages 20 to the gas outlet passages 34. It then passes from the passages 34 into the gas outlet duct 35 and then through blower 36 into the gas outlet stack 37. Similarly, gas heated to a higher drying temperature is admitted through duct 26 into the lower sections of the gas inlet passages 33, thence through the lower sections of the columns of solid material in passages 20 into gas outlet spaces 34, thence into the gas outlet duct 35 and finally therefrom through blower 36 and stack 37.

The rate of gas flow may be controlled by means of valves or dampers at the gas heating furnaces (not shown), or by control of the outlet draft. The outlet draft may be controlled by control of blower speed or by means of a damper in stack 37. The rate of gas flow is so regulated in both of the sets of superimposed sections for its passage that there is very little interflow of gas between the upper and lower sections of the solid material columns in the passages 20. Thus the solid material is subjected to two drying steps wherein the conditions are maintained substantially different, without the requirement of two separate vessels. Such an operation is of considerable importance when applied to the drying of such particle form adsorbent materials as hereinbefore mentioned. Thus in the upper section of the drier, air heated to a temperature of the order of 100° F. to 150° F. may be passed through the solid material to provide a relatively low initial rate of drying. On the other hand, air heated to temperatures of the order of 110° F. to 200° F. may be passed through the solid material in the lower section of the drier to provide a much more rapid rate of drying during its final and less delicate stages. These temperatures are representative of preferable ranges for the drying of pelleted clay-type catalysts. Other ranges may apply to other types of catalyst particles.

It will be obvious that more than two stages may be provided, if desired, by proper partitioning of the gas inlet and outlet passages. It should also be noted that the other important features of this invention which will be more particularly discussed hereinafter are not limited to the multistage type of drier but are also applicable to single stage driers.

It has been found that if the baffles 50, 51 and 52 are not provided in a drier of the above construction, uniform rate of transverse gas flow across the entire cross-section of any given column will not be obtained. This is shown by the data taken during the operation of such a drier, presented in the table below:

Table

| Horizontal distance from side of column adjacent air inlet end of gas inlet passages, feet | 0 | 2 | 4 | 6 | 8 | 10 |
|---|---|---|---|---|---|---|
| Rate of air flow through column of solid material, C. F. M./sq. ft.: | | | | | | |
| Without baffles | 75 | 80 | 92 | 105 | 116 | 127 |
| With baffles | 96 | 99 | 98 | 94 | 94 | 94 |

From the table, it will be seen that in the absence of baffles, the rate of gas flow through the solid material is greater, the greater the distance from the gas inlet end of the gas passages. This is highly undesirable for two reasons. First, the maximum allowable rate of gas throughput through such a drier is that rate above which the column or columns of moving solid material would be substantially disrupted, and in the case of uneven flow the maximum allowable gas rate would be obtained in only one section of the column of solid material and limit further increase in gas flow while the rate of gas flow in other sections of the column is still substantially below the maximum. Second, with uneven gas flow through the solid material column uneven drying rates result. As a consequence, some of the solid material may be subjected to drying rates higher than desirable for the best drying results and the solid material passing through the drier in other sections may be incompletely dried. As will be seen from the second row of data in the table, the installation of baffles at spaced intervals within the gas inlet passages completely remedied the difficulty.

The proper placement and the size of such baffles will, of course, vary depending on the drier dimensions. Preferably the width or projected cross-section of the baffles should increase progressively in direct proportion to the horizontal distance of the vertically extending baffles from the gas inlet ends of said passages. As an example, in a drier wherein the gas inlet passages were approximately 8 inches wide between partitions and extended approximately 10 feet across a drier, substantially vertical baffles were positioned 2½ feet, 5 feet and 7½ feet horizontally from the inlet end of the gas passages. These baffles were positioned substantially centrally with respect to the width of the passages and measured 2 inches, 4 inches and 6 inches in width, respectively. It will be understood that the above proportioning of the baffles represents the preferred proportioning and that advantages may still be obtained from the use of such baffles with other than preferred proportioning but that the advantages gained therefrom will decrease with increased deviation from the preferred proportioning. It has been further found that the above described baffle arrangement provides proper gas distribution as shown only when the gas inlet and outlet duct area is maintained at least approximately as great as the sum of the cross-section for gas flow of the gas inlet passages 33 or of the gas outlet passages 34.

In the operation of such a drier, as hereinabove described, that portion of the solid material passing downwardly through a solid material passageway which is near the adjacent gas outlet passage will be contacted with drying gas only after it has passed through most of the column width and has picked up considerable moisture, whereas that portion of the solid material near the gas inlet will be subjected only to fresh drying gas containing somewhat less moisture. If the column width is sufficiently great so that the effluent gas is saturated with the liquid removed from the solid at the outlet gas temperature and pressure condition, little or no drying of the solid material will be accomplished in that section of a column adjacent the gas outlet passage. Moreover, if the percentage of humidity of the effluent gas stream is considerably greater than that of the entering gas a similar difficulty will result. It has been found that this difficulty may be overcome by careful control of the relationship between the width of the solid material columns or passageways defining said columns in the direction of gas flow, the increase in percentage humidity and the rate of flow of the drying gas. The relationship may be expressed by the formula:

$$\text{I} \qquad W = \frac{KV}{R}$$

where W is the width of the column of solid material in feet, V is the rate of gas flow therethrough in pounds per minutes per square foot of column cross-section perpendicular to the gas flow, K is the pounds of liquid evaporated per pound of drying gas and R is the rate of transfer of liquid from the solid material to the stream of drying gas in pounds of liquid per cubic foot of solid material per minute.

The relationship of K to the percentage humidity H may be expressed as:

$$\text{II} \qquad K = \frac{HS - 100M}{100}$$

where M=pounds of liquid per pound of gas in the inlet gas stream to the drier, S=pounds of liquid per pound of gas required to saturate the gas at the drier outlet conditions, and H is the percentage humidity of the effluent gas or 100 times the fraction obtained by dividing the liquid content of the dried effluent gas by the theoretical liquid content of said gas at saturation under the same temperature and pressure conditions. It will be noted that whereas the liquid evaporated from the solid material is usually water, the above terms are intended to be broad enough to cover any other liquid which might be encountered. By substitution of Equation II above for K in Equation I, a more easily used Equation III is derived.

$$\text{III} \qquad W = \frac{V(HS - 100M)}{100R}$$

In equation III, the numerical value of S and M are obviously dependent upon the particular operating conditions of a given drying operation. They will be constants for any given fixed set of conditions and the values thereof be readily found in the literature once the conditions are fixed. The proper value of H will depend upon the solid material to be dried, the liquid to be evaporated, the drying gas and the stage of the drying, as well as the operating temperature and pressure. Certain limits may be set to the numerical value of H. Thus H, the percentage humidity of the effluent gas should always be limited substantially below 100, which would correspond to saturation. Moreover, the percentage humidity of the effluent gas should broadly be not more than about one-half the sum of 100 plus the percentage humidity of the inlet gas. For drying clay-type solid adsorbent pellets, it has been found that the value $$\frac{(HS - 100M)}{100}$$

should be less than about one-fourth of $(S-M)$. In other words, the increase in the amount of moisture per unit weight of drying gas (on the bone dry basis) between the inlet and outlet gas should be limited below about one-fourth of the possible increase if the outlet gas were saturated with the moisture removed from the solid material at the same outlet condition of temperature and pressure. In most preferred operations the value $$\frac{(HS - 100M)}{100}$$

should be controlled less than about one-eighth of the value $(S-M)$.

The numerical value of R is dependent upon the nature and size of the particle form solid adsorbent material, the liquid being removed therefrom, the drying gas, the temperature and pressure of the operation and the average percentage humidity of the drying gas during its passage through the solid material and the stage of the drying. It may be determined by experiment for the particular materials and conditions involved or in many cases calculated from data in the literature. It has been found that the value of R may range between 0.02 and 0.2 pound of water per cubic foot of solid material per minute in operations involving the drying of clay-type adsorbent materials for use as conversion catalysts. In a two stage drier used for drying a particular clay-type pelleted material of about 4 mm. diameter, the value of R was found to range between 0.04 and 0.2 in the upper stage and between 0.02 and 0.1 in the lower stage. These values may be somewhat higher for the drying of other types of solid materials.

The value of V may vary over wide limits dependent upon the particular value of K and R for the particular operation involved and upon the chosen width of the solid material columns in the direction of gas flow. The same is obviously true of the values of W. In any event, the rate of gas flow should be below that which would substantially impede the flow of the solid material columns, and this maximum rate is dependent on the particular solid material and gas involved as well as upon the operation condition. This maximum value may be easily determined by simple experimental methods well known to those skilled in the art or in many cases from existing data in the literature. It will be apparent that this limit will also limit the maximum allowable width of the solid material columns. It has been found in the drying of ordinary adsorbent materials within the size range of 4 to 8 mesh, the width of the solid material passages or columns is preferably less than 0.5 foot. For smaller size material the passage width may be limited to a lower maximum and for larger size material the passage width may be somewhat greater.

The drying method provided by this invention, due to the provision of relatively large cross-sectional areas for gas flow through the solid material permits the flow of gas therethrough at a very low pressure drop. Satisfactory operation was obtained, for example at a gas flow of 100 C. F. M. per square foot of column cross-section perpendicular to gas flow at a total overall pressure drop of 2.5 inches of water. Such low pressure drops permit the use of low pressure blowers to draw the drying gas through the drier rather than the use of compressors, thereby greatly reducing the cost of operation. The inlet gas may be heated by simply mixing the inlet air with furnace flue gas, again reducing the cost of operation.

As an example of the advantage of the method of this invention, a drier of the type described is now being used to dry newly extruded clay-type pelleted catalyst made from a Super Filtrol type clay and having a pellet diameter of about 4 mm. The drier has a volume of 550 cubic feet and an air charge of about 148,000 C. F. M. The average increase in percentage humidity in the drying gas due to passage through the drier is maintained less than about 5%. The drier has a capacity of approximately fifty tons of dry catalyst per day, of which the breakage due to drying is less than 5%. When the same catalyst was dried in commercial rotary kiln driers, the breakage of pellets was greater than 90% of the finished material.

It should be understood that the specific examples of the operation according to this invention are intended as exemplary in character and are not to be construed as limiting the scope of this invention except as it is otherwise limited by the following claims.

We claim:

1. A method for drying a particle form adsorbent solid material of the type adapted for use in the catalytic conversion of hydrocarbons at elevated temperatures comprising passing the particle form solid material substantially vertically through a drying zone as a substantially compact column of downwardly flowing solid material, and passing a drying gas horizontally through said column at a substantially uniform rate throughout the entire column cross-section within said drying zone, ascertaining the amount of moisture picked up by said gas per unit weight thereof on a bone dry basis and ascertaining the maximum possible amount of moisture which could be picked up by said gas if it were discharged from said column saturated with moisture at the same conditions of temperature and pressure, regulating the rate, temperature and pressure of gas flow through said column to limit the percentage humidity in the outlet gas substantially below 100% and to limit the difference between the amount of moisture in a unit weight of outlet gas and the amount of moisture in a unit weight of inlet gas on the basis of bone dry gas to less than said about one-fourth of said maximum possible amount of moisture pick up.

2. In the drying of particle form solid clay-type adsorbent materials by removal of water therefrom by heated gases the process steps comprising passing the particle form solid adsorbent materials substantially vertically through a confined drying zone as a plurality of substantially compact columns of controlled widths passing in parallel a heated drying gas horizontally through said columns at a substantially uniform predetermined controlled rate across the entire column vertical cross-section within the drying zone, controlling the rate of gas flow, V, below that which would substantially disrupt the column of solid material, further controlling said rate of gas flow in pounds per minute per square foot of column cross-section, V, to maintain the relationship fixed by the formula:

$$W = \frac{V(HS - 100M)}{100R}$$

when W, the column width in the direction of gas flow is less than about one-half foot, R, the rate of transfer of water from the solid to the gas is a determinable constant between the ranges 0.02 and 0.2 pounds of water per cubic foot of solid per minute, S is the weight of water in pounds that would be held by a unit weight of drying gas if saturated under the temperature and pressure conditions of the effluent gas, M is the weight of water in pounds present in a unit weight of inlet gas, and H is the percentage humidity of the effluent gas and substantially below 100% and when the value $$\frac{(HS - 100M)}{100}$$

is less than one-fourth of $(S - M)$.

3. A method of drying particle form solid adsorbent material of the type suitable for use as a catalyst in the cracking conversion of hydrocarbons comprising maintaining a substantially compact column of particle form solid adsorbent material within a drying zone, said column being limited to a horizontal width of less than six inches in at least one direction, replenishing said column at its upper end with moisture containing solid adsorbent material and uniformly withdrawing dried solid adsorbent material from the lower end thereof, passing a drying gas at a controlled temperature horizontally uniformly across the entire column within the drying zone in that direction wherein the horizontal width of the column is less than six inches, controlling the temperature, pressure and rate of said drying gas flow to maintain the actual increase in the amount of vapor between the drying gas entering and leaving said column less than about one-fourth the maximum possible increase if said gas discharged from the column saturated with said vapor at the same gas discharge temperature and pressure.

4. In the drying of a particle form solid clay-type adsorbent material by the removal of water therefrom by heated gases the process steps comprising: passing the particle form solid adsorbent material substantially vertically through a confined drying zone as a plurality of substantially compact columns, passing a heated drying gas through said columns at a substantially uniform controlled rate across the entire column vertical cross-section within the drying zone, while maintaining the rate of flow of said drying gas and the width of said columns of solid material in the direction of gas flow within the relationship set by the formula $$W = \frac{V(HS - 100M)}{100R}$$

when R, the rate of transfer of water from the solid to the gas in pounds per cubic foot of solid per minute is a determinable constant between the ranges 0.02 and 0.2, W, the width of said solid material columns is less than 0.5 foot, S is the weight in pounds of water that would be held by a unit weight of drying gas if saturated at the temperature and pressure of the effluent gas, V is the rate of drying gas flow through each column in pounds per minute per square foot of column cross-section, M is the weight in pounds of water present in a unit weight of inlet gas, and H is the percentage humidity of the effluent gas and of a value below 100% and when the value of $$\frac{HS - 100M}{100}$$

is less than one-eighth of $(S - M)$.

5. A method for drying a particle form clay-type adsorbent material by removal of water therefrom by heated gases comprising: flowing the particle form adsorbent downwardly through a confined zone as a substantially compact elongated column, having a maximum width between wto sides of less than about six inches, passing a heated drying gas horizontally through said column to remove moisture from said adsorbent, withdrawing the drying gas containing said removed moisture from said column along a side thereof opposite the side of its entry, ascertaining during the gas and adsorbent flow the possible amount of moisture in the outlet gas if saturated under the temperature and pressure conditions of its withdrawal from said column, ascertaining the maximum possible moisture pick up from said adsorbent by a unit weight of said drying gas if saturated under said temperature and pressure conditions of its withdrawal from said column, ascertaining the actual amount of moisture pick up by a unit weight of said gas passing through said column, and then controlling the rate of gas flow relative to said adsorbent flow to maintain the amount of actual moisture pick up by said gas less than about one-fourth of the ascertained maximum possible moisture pick up by said gas, and withdrawing dried contact material from the lower section of said confined zone.

6. A method for drying a particle form clay-type adsorbent material by removal of water therefrom by heated gases comprising: flowing the particle form, moisture containing adsorbent downwardly as a substantially compact elongated column, passing a heated drying gas horizontally across said column substantially all along its length, while maintaining all along said column the relationship between the rate of gas flow and the column width in the direction of gas flow expressed by the formula:

$$W = \frac{V(HS - 100M)}{100R}$$

in which W is the column width in the direction of gas flow in feet, V is the rate of gas flow in pounds per minute per square foot of column cross-section, R the rate of transfer of water from the solid to the gas in pounds per cubic foot of solid per minute is a determinable constant between the ranges 0.02 and 0.2. S is the weight in pounds of water that would be held by a unit weight of drying gas if saturated at the temperature and pressure of the effluent gas, M is the weight in pounds of water present in a unit weight of inlet gas, and H is the percentage humidity of the effluent gas and of a value below 100%; ascertaining the actual value of $$\frac{HS - 100M}{100}$$

ascertaining the value of $S - M$ under the same gas outlet conditions of temperature and pressure; further controlling the rate of gas flow, V, to maintain the value $$\frac{HS - 100M}{100}$$

less than about one-fourth the value $(S - M)$.

7. A method for drying freshly extruded solid clay-type adsorbent materials which comprises: passing said freshly extruded solid clay-type material downwardly through a confined drying zone as a substantially compact column of gravitating particles and passing a drying gas substantially horizontally across said column, while maintaining the relationship between the column width in the direction of gas flow and the rate and temperature of the gas flow within a range wherein the gas discharges from said column unsaturated with moisture and the increase in the absolute humidity of said drying gas in flowing across said column is not substantially more than about one-fourth the difference between the absolute humidity of saturated gas at the same discharge temperature and pressure and the actual absolute humidity of said drying gas as it entered said column whereby the adsorbent is uniformly dried without serious breakage, and withdrawing the dried adsorbent from the lower section of said drying zone.

8. A method for drying particle form solid clay-type adsorbent materials comprising: flowing the particle form adsorbent downwardly as a substantially compact elongated column, passing a heated drying gas horizontally across an upper portion of said column to remove moisture from said adsorbent, passing a second stream of heated gas heated to a substantially higher temperature than said first named stream of gas horizontally across a lower portion of said column to remove additional moisture from said adsorbent, maintaining in said upper and lower portions of said column the relationship between the rate of gas flow and the column width in the direction of gas flow expressed by the formula:

$$W = \frac{V(HS - 100M)}{100R}$$

in which W is the column width in the direction of gas flow in feet, V is the rate of gas flow in pounds per square foot of column cross-section, R, the rate of transfer of water from the solid to the gas in pounds per cubic foot of solid per minute is a determinable constant within the range 0.04 to 0.2 in said upper portion of said column and within the range 0.02 to 0.1 in said lower portion of said column, S is the weight in pounds of water that would be held by a unit weight of inlet gas, M is the weight in pounds of water present in a unit weight of inlet gas, and H is the percentage humidity of the effluent gas and of a value below 100 percent; ascertaining the actual values of $$\frac{HS - 100M}{100}$$

for said upper portion of said column and for said lower portion of said column, ascertaining the value of $S - M$ under the same gas outlet conditions of temperature and pressure for said upper and lower portion of said column; further controlling the rate of gas flow, V, to maintain the value $$\frac{HS - 100M}{100}$$

less than about one-fourth the value $S - M$ in both the upper and lower portions of said column.

9. A method for removing water from particle form solid clay-type adsorbent materials comprising the steps passing the wet particle form solid clay-type adsorbent material downwardly through a confined drying zone as a plurality of substantially compact columns of controlled widths, passing a heated drying gas in parallel, horizontally through the upper sections of said columns at a substantially uniform rate across the entire vertical cross-section of the upper sections of said columns within the drying zone, separately passing a drying gas heated to a substantially higher temperature than said first named drying gas in parallel horizontally through the lower sections of said columns at a substantially uniform rate across the entire vertical cross-section of the lower sections of said columns within the drying zone, controlling the rates of gas flow through the two superimposed sections of said columns to limit the humidity of the effluent gas from both sections below saturation and to limit the increase in the absolute humidity of the gas flowing across at least the lower sections of said columns to an amount which is below about one-fourth of the difference between the absolute humidity of gas saturated at the temperature and pressure conditions of discharge from said section of said columns and the absolute humidity of the gas entering said columns.

CHARLES H. LECHTHALER.
      JOHN W. PAYNE.
      PETER D. VALAS.

REFERENCES CITED

The following references are of record in the file of this patent:

UNITED STATES PATENTS

| Number | Name | Date |
|---|---|---|
| 575,468 | Ewing | Jan. 19, 1897 |
| 707,323 | Hess, Jr. | Aug. 19, 1902 |
| 1,151,268 | Hess | Aug. 24, 1915 |
| 1,262,842 | Randoph | Apr. 16, 1918 |
| 2,388,735 | Gary et al. | Nov. 13, 1945 |
| 2,409,263 | Ewing et al. | Oct. 15, 1946 |

FOREIGN PATENTS

| Number | Country | Date |
|---|---|---|
| 336,138 | Germany (Winde) | Apr. 26, 1921 |